(12) United States Patent
Sharma et al.

(10) Patent No.: US 12,476,867 B2
(45) Date of Patent: Nov. 18, 2025

(54) SYSTEMS AND METHODS FOR DYNAMIC CAPACITY PLANNING OF NETWORK

(71) Applicant: Rakuten Symphony, Inc., Tokyo (JP)

(72) Inventors: Rahul Sharma, Indore (IN); Mantu Kumar Tiwari, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/189,586

(22) Filed: Mar. 24, 2023

(65) Prior Publication Data

US 2024/0323081 A1 Sep. 26, 2024

(51) Int. Cl.
*H04L 41/0816* (2022.01)
*H04L 41/0604* (2022.01)
*H04L 41/147* (2022.01)
*H04L 41/16* (2022.01)

(52) U.S. Cl.
CPC ...... *H04L 41/0816* (2013.01); *H04L 41/0604* (2013.01); *H04L 41/147* (2013.01); *H04L 41/16* (2013.01)

(58) Field of Classification Search
CPC ............. H04L 41/0604; H04L 41/0816; H04L 41/147; H04L 41/16
See application file for complete search history.

(56) References Cited

U.S. PATENT DOCUMENTS

| 10,855,567 | B1 * | 12/2020 | Mukhopadhyaya | .... H04L 43/18 |
| 2008/0139196 | A1 * | 6/2008 | Zhang | .... H04W 24/08 455/423 |
| 2019/0034829 | A1 * | 1/2019 | Guim Bernat | ........ G06F 3/0655 |
| 2019/0280918 | A1 * | 9/2019 | Hermoni | ............... H04L 41/069 |
| 2019/0342195 | A1 * | 11/2019 | Mermoud | .............. G06N 3/049 |
| 2021/0011908 | A1 * | 1/2021 | Hayes | ..................... G06N 20/00 |
| 2021/0033066 | A1 * | 2/2021 | Beckerman | ............. F03D 7/028 |
| 2021/0160746 | A1 * | 5/2021 | Diggins | ............ H04W 36/0083 |
| 2022/0172076 | A1 * | 6/2022 | Kanza | ..................... G06N 3/044 |
| 2022/0198256 | A1 * | 6/2022 | Makhija | ........... G06Q 10/06315 |
| 2023/0403606 | A1 * | 12/2023 | Lunardi | ................ H04W 24/02 |

* cited by examiner

Primary Examiner — John M Macilwinen
(74) Attorney, Agent, or Firm — Sughrue Mion, PLLC

(57) ABSTRACT

An apparatus for capacity planning in a network includes at least one memory storing instructions and at least one processor configured to execute the instructions to obtain network data corresponding to at least one network node and historic dimensional data corresponding to the network, generate transformed data from the network data and the historic dimensional data based on at least one configuration parameter, input the transformed data into a machine learning (ML) model, generate, by the ML module, at least one capacity prediction of the network based on the transformed data, and adjust at least one dimensioning parameter of the network based on the at least one capacity prediction.

18 Claims, 6 Drawing Sheets

SYSTEMS AND METHODS FOR DYNAMIC CAPACITY PLANNING OF NETWORK

BACKGROUND

1. Field

Apparatuses and methods consistent with example embodiments of the present disclosure relate to capacity planning in a network environment.

2. Description of Related Art

In related art, capacity planning may be performed by a capacity planning team responsible for the network environment (e.g., a customer wireless network). The capacity planning team is typically limited to performing capacity planning adjustments of the network environment based on manual analysis of data. For example, when a memory utilization in a network is determined to be high, an architect may assess information and then perform a "sizing" on the network, which is reactionary and does not prevent the problem from occurring (i.e., it only corrects the problem after it has occurred). Thus, the analysis is reactive in nature (e.g., waiting for a pattern to occur) and involves human intervention, leading to sub-optimal capacity planning adjustments of the network environment.

For example, during an initial configuration of a network environment (e.g., an initial set up of an infrastructure), the network environment may be configured based on capacity planning for a known customer base. However, over time, the customer base may change or the number of events occurring in the network environment may change (increase/decrease, change in type, etc.). In related art, to address these concerns, capacity planning requires analysis that only reacts after these changes occur, rather than being able to predict or plan for upcoming changes. This further leads to sub-optimal capacity planning adjustments of the network environment.

SUMMARY

According to embodiments, systems and methods are provided for improved and proactive capacity planning in a network environment.

According to an aspect of the disclosure, an apparatus for capacity planning in a network may include at least one memory storing instructions and at least one processor configured to execute the instructions to obtain network data corresponding to at least one network node and historic dimensional data corresponding to the network, generate transformed data from the network data and the historic dimensional data based on at least one configuration parameter, input the transformed data into a machine learning (ML) model, generate, by the ML module, at least one capacity prediction of the network based on the transformed data, and adjust at least one dimensioning parameter of the network based on the at least one capacity prediction.

According to an aspect of the disclosure, a method for capacity planning in a network may include obtaining network data corresponding to at least one network node and historic dimensional data corresponding to the network, generating transformed data from the network data and the historic dimensional data based on at least one configuration parameter, inputting the transformed data into a ML model, generating, by the ML module, at least one capacity prediction of the network based on the transformed data, and adjusting at least one dimensioning parameter of the network based on the at least one capacity prediction.

According to an aspect of the disclosure, a non-transitory computer-readable storage medium may store instructions that when executed by at least one processor, cause the at least one processor to obtain first data corresponding to at least one network node in a network and second data corresponding to the network, generate transformed data from the first data and the second data based on at least one configuration parameter, input the transformed data into a ML model, generate, by the ML module, at least one capacity prediction of the network based on the transformed data, and adjust at least one dimensioning parameter of the network based on the at least one capacity prediction.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
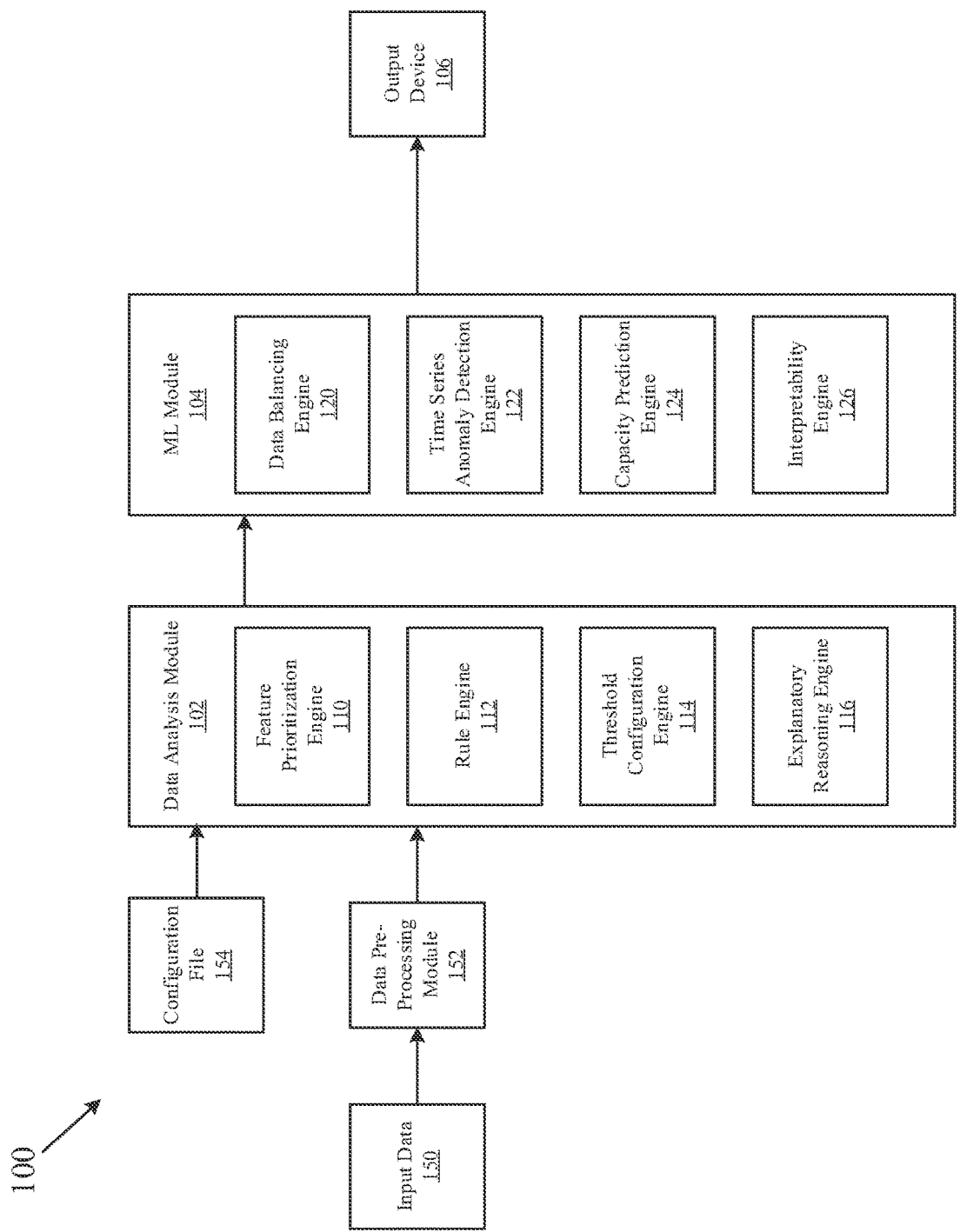
FIG. 1 is a diagram of a system for capacity planning, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a system, method, apparatus, etc., in which network data corresponding to a network node and historic dimensional data corresponding to the network is obtained, transformed data from the network data and the historic dimensional data is generated based on a configuration parameter, the transformed data is input into a machine learning (ML) model, at least one capacity prediction of the network is generated by the ML module based on the transformed data, and at least one dimensioning parameter of the network is adjusted based on the at least one capacity prediction. That is, the system may obtain network data corresponding to network data points such as call rejections, hardware utilization, etc., along with historic dimensional data of the network, such as previously dimensioning (sizing) settings of the network. By obtaining the data and filtering the data based on, for example, a configuration parameters, such as a utilization threshold, the system may generate transformed data to be input to an ML model, which may generate capacity predictions of the network. Thus, capacity predictions of the network may be automatically generated by the system, removing the manual data analysis of the related art. Furthermore, adjustments to the network may be implemented proactively based on historical data, rather than reactively, thereby allowing the network to better dynamically adjust to changes throughout the network environment.

That is, the system may provide automated data collection to collect, for example, logs, central processing unit (CPU) utilization and memory utilization for each network node within the network environment. Furthermore, the system provides a centralized data storage which is deployed and configured to collect the data from the individual network nodes. Since the data is collected in a centralized location, the data provides a convenient overview of the overall condition of the network environment. The system may provide a dashboard (e.g., a graphical user interface (GUI)) to display descriptive analytics, such as total traffic, total utilization, active network nodes, nodes encountering or about to encounter errors, etc., and predictive analytics for adjusting dimensional parameters of the network. The dimensioning needs of the network nodes may be shown in the dashboard in an automated manner such that little or no manual intervention is required. The system may provide an alarm when the at least one capacity prediction indicates that the network requires dimensioning of at least one dimensioning parameter. Such configurations may reduce an amount of human time required to monitor and adjust parameters of the network, reducing human errors while also providing for proactive capacity planning. Thus, the number of connection failures or other incidents occurring in the network may be reduced.

FIG. 1 is a diagram of a system for capacity planning, according to an embodiment. The system 100 may include a data analysis module 102, an ML module 104, and an output device 106 (e.g., a display, a GUI, etc.).

Input data 150 may be provided to the data analysis module 102. The input data 150 may include network data, including raw data associated with nodes of the network and data indicative of current statuses, such as network logs, CPU statistics, database logs, etc. The network data may include current and historical data related to key performance indicators (KPI)/configurations of the network. The network data may include data on the date and time, aggregation of a number of successes, and aggregation of a number of failures, an aggregation of a number of timeouts, an aggregation of a number of rejections (the aggregations referred to herein may indicate an aggregation of events of an individual node and/or any number of nodes within the network environment), a throughput of application programming interface (API) responses, a total number of subscribers in the network, a response time of a node(s), a number of transactions per second, a number of calls over a predetermined amount of time (e.g., hourly, daily, monthly, etc.), a number of call rejections, a number of database locks, other database statistics, CPU utilization percentage (e.g., a minimum percentage, a maximum percentage, an average percentage, etc.), a memory utilization percentage (e.g., a minimum percentage, a maximum percentage, an average percentage, etc.), a current hardware configuration of the node(s) and/or a historical indication of failures and crashes.

The input data 150 may also include historic dimensional data of the network. The historic dimensional data of the network may include data corresponding to previous dimensioning (e.g., previous sizing) of the network or previous statuses of network nodes. The historic dimensional data may correspond to previous network data from a predetermined time span of the network (e.g., one week prior, three months prior, etc.). The historic dimensional data may include historical data related to a sizing or dimensioning of a capacity of the network, including dimensioning at a time where the KPI/configurations were recorded for the network data. In particular, the historic dimensional data of the network may include a date of dimensioning, a time of dimensioning, a CPU utilization that occurs during a date/time of dimensioning, a memory utilization that occurs during a date/time of dimensioning, and/or added capacities, such as added CPUs, memories, servers, nodes, etc.

The network data and/or the historic dimensioning data may also include data regarding traffic per second (TPS), where the data on traffic may include voice calls, short messaging services (SMS), data use, balance inquiries, interrogatories, recharges, top-ups, notifications, etc. The network data and/or the historic dimensioning data may also include other CPU utilization data.

The input data 150 may be input to a data pre-processing module 152 for pre-processing. The data pre-processing module 152 may be configured to aggregate, filter and otherwise transform the input data 150. For example, the data pre-processing module 152 may be configured to transform data associated with network counter logs and CPU statistic logs. The function of the pre-processing module 152 may be implemented with the data analysis module 102. In particular, the data pre-processing module 152 may be configured to data aggregation, filtration and transformation. That is, the raw data from network nodes may be first sent to the data pre-processing module 152, which may be configured to, from the raw data, aggregate a number of successes, a number of timeouts, a number of rejections, etc., captured from the network nodes. The data pre-processing module 152 may be configured to calculate an average response time, a minimum response time, a maximum response time, etc. . . . The data pre-processing module 152 may be configured to remove null values from the raw data, and correspond historical dimensioning data with network data.

The data analysis module 102 may include a feature prioritization engine 110, a rule engine 112, a threshold configuration engine 114 and an explanatory reasoning engine 116. The data analysis module 102 may be configured to receive raw data, such as input data 150, and/or pre-processed data, such as data pre-processed by the data pre-processing module 152. The data analysis module 102 may be configured to obtain a preconfigured configuration file 154. The configuration file 154 may include configuration parameters, such as features, rules, thresholds, description of features, failures/errors, etc., for filtering/transforming the received data. That is, the data analysis module 102, as well as the data pre-processing module 152 may be configured to transform the raw data into data interpretable and optimized for ML training and execution. The data analysis module 102 and the data pre-processing module 152 may be configured as a single module or multiple modules.

The feature prioritization engine 110 may be configured to prioritize features based on configuration parameters from the configuration file 154. That is, the feature prioritization engine 110 may be configured to prioritize features based on data features identified (e.g., by a domain expert) and provided in the configuration file 154. For example, the feature prioritization engine 110 may be configured to prioritize data corresponding to particular KPIs, based on configuration parameters obtained from the configuration file 154. For example, the feature prioritization engine 110 may, based on the configuration file, prioritize data indicating past and current CPU usage over data indicating past and current memory usage to emphasize CPU resource analysis in the capacity predictions.

The rule engine 112 may be configured to apply rules obtained from the configuration file 154 to the obtained data. That is, the rule engine 112 may obtain rules from the configuration file 154 and filter records based on the rules. For example, a rule may include a data exclusionary rule. In particular, the rule may include at least one filtering rule to exclude data during a predetermined time frame. For example, the filtering rule may be a rule for excluding data corresponding to a holiday or other busy season, as such data may not be indicative of future capacity needs of the network. The filtering rule may also cause the system to identify such data for a temporary arrangement, such that any capacity predictions made can be identified as potentially temporary. The filtering rule may be a rule for excluding data associated with business-to-business (B2B) subscribers, as such subscribers may utilize the network in a manner that, if such data would be considered for future capacity planning, would incorrectly alter such future planning. The filtering rule may also be a rule based on prioritization of features.

The threshold configuration engine 114 may be configured to implement threshold conditions for implementing future capacity planning. That is, the threshold configuration engine 114 may be configured to perform filtration of records (e.g., data) based on thresholds (e.g., thresholds obtained from the configuration file 154). For example, the threshold configuration engine 114 may obtain particular network parameter thresholds, which may be obtained by the configuration file 154. The threshold conditions may include CPU utilization being above a predetermined threshold (e.g., 90% utilization), a number of API responses requiring more time than expected to process, a memory capacity increase greater than a predetermined threshold (e.g., 80%), etc. Based on a threshold condition being met, the data analysis module 102 may be configured to collect further data or transform data to be processed by the ML module 104 to generate at least one capacity prediction for the network, such that a dimensioning parameter of the network can be adjusted to account for the network conditions that cause the thresholds to be met/exceeded.

The dimensioning parameter may include at least one of a number of CPUs required, an extra storage requirement, a number or type of network nodes required, etc. For example, during real-time charging (fee charging) of a subscriber, an online charging system (OCS) network node may be failing due to high volume of calls or heavy load on the OCS node. Thus, the system may provide at least one capacity prediction that more OCS nodes in the network may be needed due to the high number of transactions on the OCS. Furthermore, the OCS may refer to a system/node in the telecommunication network that is used to charge the subscribed on a real-time basis. Additionally, the network/system may include a service data point (SDP) network node that may be configured to provide subscriber information, and the rate plans for subscribers may be configured on SDP nodes.

The explanatory reasoning engine 116 may be configured to extract or determine reasoning for specific features being utilized by the data analysis module 102. That is, the explanatory reasoning engine 116 may be configured to provide reasons for failures and rejections based on historical data (e.g., orders may fail due to an order update microservice failure, and the explanatory reasoning engine 116 may be configured to provide such reasons). For example, the explanatory reasoning engine 116 may extract feature reasonings from the configuration file 154, and the reasonings may indicate a reason for a threshold being exceeded. For example the explanatory reasoning engine 116 may determine orders fail due to a failure of an order update microservice, calls are rejected due to memory failures in a subscriber database/server, etc.

Utilizing the data, including the network data and historic dimensional data, along with the configuration file 154, the data analysis module 102 may transform the received data into data relevant for capacity planning. The transformed data may be input to the ML module 104 to generate at least one capacity prediction, and the system 100 may be configured to adjust at least one dimensioning parameter of the network based on the at least one capacity prediction.

The ML module 104 may include a data balancing engine 120, a time series anomaly detection engine 122, a capacity prediction engine 124 and an interpretability engine 126. The data balancing engine 120 may be configured to provide techniques to intelligently oversample and undersample different scenarios for capacity planning. The time series anomaly detection engine 122 may be configured to leverage time series analysis techniques, such as detecting trends and seasonality, de-trending, removing seasonality, forecasting, and outlier detection. The capacity prediction engine 124 may be configured to leverage various ML-based models, such as sklearn, xgboost, etc., to determine at least one capacity prediction for the network. The capacity prediction may include a prediction on CPU usage, a prediction on memory usage, a prediction on a number of nodes to be connected, etc.

A capacity prediction may result in the system detecting an anomaly when viewing the current system dimensioning versus the capacity prediction. For example, a capacity prediction generated may predict a future capacity usage that exceeds parameters of the current dimensioning of the network. Thus, the system may determine the excess of the parameters of the current dimensioning of the network to be an anomaly, and may generate a corresponding alarm to indicate the anomaly. In response to the capacity prediction, the system may then adjust at least one dimensioning parameter of the network to compensate for the anomaly. For example, if the capacity prediction indicates that a future CPU usage of the network or of network nodes exceeds the current dimensioning parameters of the network, the system may adjust the CPU resources (e.g., the dimensioning parameter related to CPU availability) for the network such that the network is proactively configured to handle the capacity change indicated by the capacity prediction.

The time series anomaly detection engine 122 may be configured to determine whether an anomaly exists based on comparing the network data and/or historic dimensional data with a threshold, and then to generate an alarm based on the threshold being exceeded. For example, the threshold may be CPU>80%, and when the time series anomaly detection engine 122 generates a capacity prediction that the network will exceed the CPU threshold, the time series anomaly detection engine 122 may generate an alarm. The alarm may indicate that at least one dimensioning parameter of the network should be adjusted.

The interpretability engine 126 may be configured to implement techniques, such as LIME, shapely, etc., to build local and global explanation for the data and ML models.

The output device 106 may be configured to output (e.g., display, transmit, etc.) the at least one capacity prediction for future capacity planning generated by the ML module 104, as well as the determined reasons for increasing and decreasing dimensioning of the network as determined by the ML module 104. Accordingly, the system 100 may adjust at least one dimensioning parameter of the network based on the at least one capacity prediction generated by the ML module 104.

Figure 2:
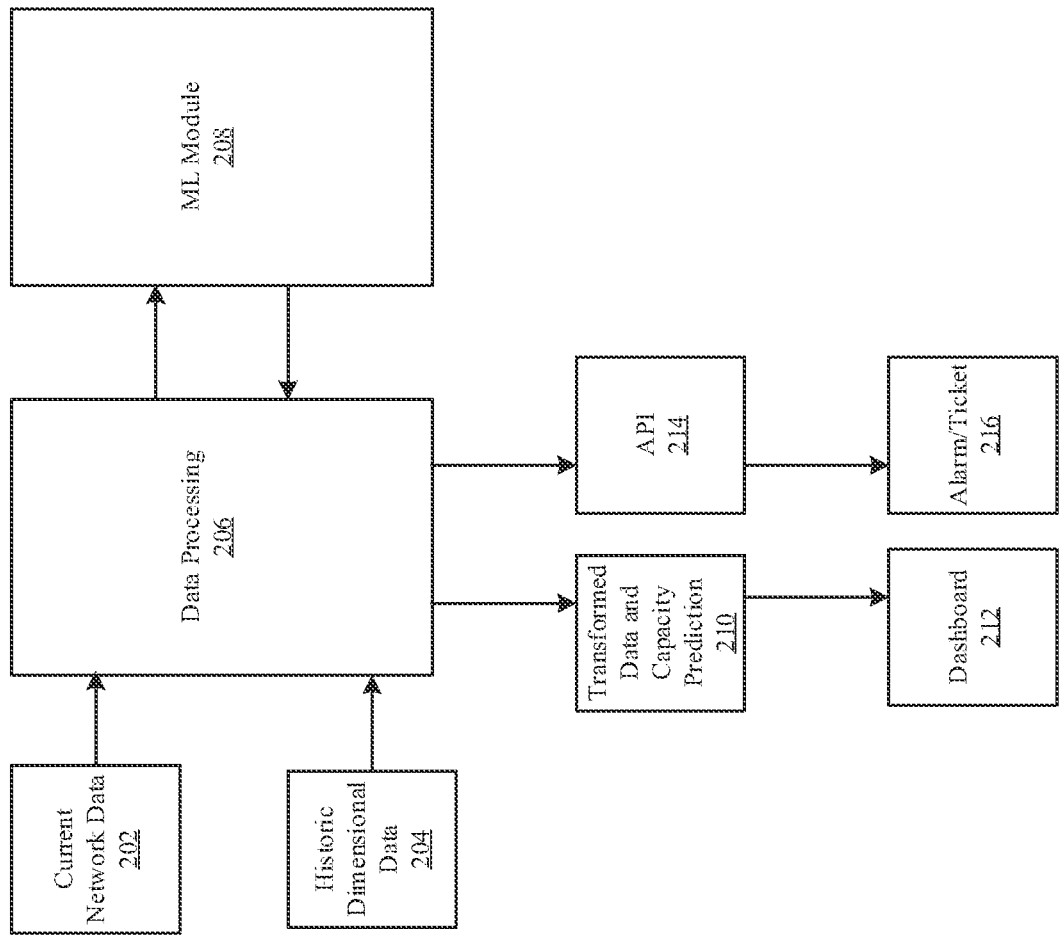
FIG. 2 is a diagram of an overall flow of an operation for capacity planning, according to an embodiment.

FIG. 2 is a diagram of an overall flow of an operation for capacity planning, according to an embodiment. The input data may include network data 202 and historic dimensional data 204 as described above. The network data 202 may be stored in a network data database, and the historic dimensional data 204 may be stored in an historic dimensional data database. Alternatively, the network data 202 and the historic dimensional data 204 may be stored in the same database.

The system may obtain the network data 202 and the historic dimensional data 204, and perform data processing at block 206 as described above. The data may also be transformed in block 206 by, for example, a data analysis module, such as the data analysis module 102. The system may then obtain the transformed data and input the transformed data into the ML module 208 to generate at least one capacity prediction for the network. The at least one capacity prediction may be input back to the data processing block 206 for further processing. The system may then obtain the transformed data and the at least one capacity prediction 210, and then output the transformed data/at least one capacity prediction to a dashboard/visualization device 212. Furthermore, the system may include an API 214 for generating alerts corresponding to the at least one capacity prediction. The alerts may indicate to a user of the system or to the system itself in embodiments where the system is fully automated that a capacity issue is impending that requires some action. The system may generate an alarm/ticket 216 corresponding to the capacity issue, such that the system, or a user of the system, may adjust at least one dimensioning parameter of the network to account for the alert corresponding to the at least one capacity prediction.

Figure 3:
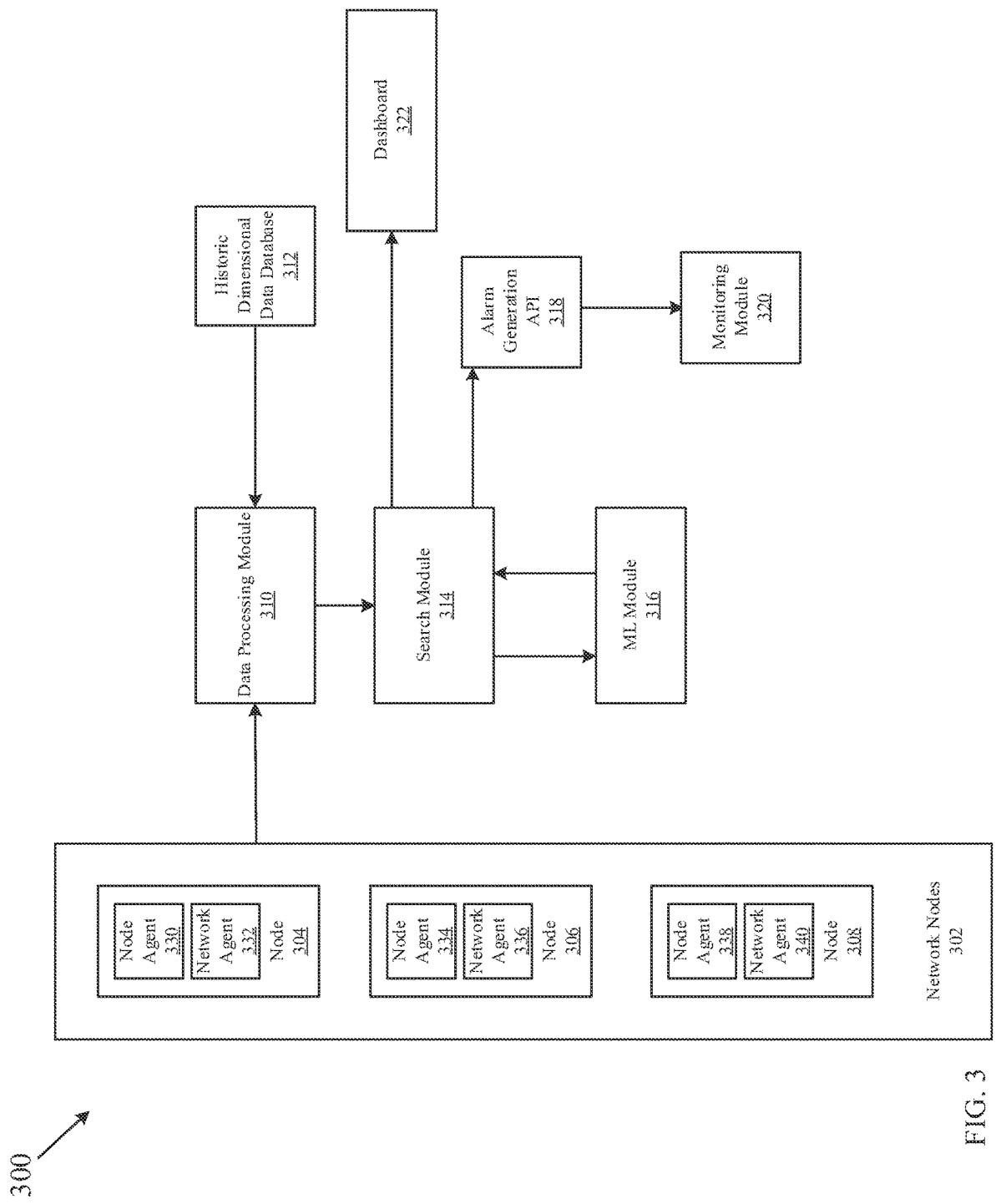
FIG. 3 is a diagram of a system architecture for capacity planning, according to an embodiment; embodiment.

FIG. 3 is a diagram of a system architecture for capacity planning, according to an embodiment. The system architecture 300 may include a plurality of network nodes 302, including network node 304, 306 and 308, a data processing module 310, a historic dimensional data database 312, a search module 314, an ML module 316, an alarm generation API 318, a monitoring module 320, and a dashboard 322. Although only three network nodes are depicted, more or less network nodes may be implemented with the system architecture 300.

Each of the network nodes 302 may include agents. For example, network node 304 may include a node agent 330 and a network agent 334, network node 306 may include a node agent 334 and a network agent 336, and network node 308 may include a node agent 338 and a network agent 308. The network nodes 302 may include various nodes associated with a telecommunication intelligent network, such as a charging control node (CCN) for session handling, an OCS node for real-time charging, a policy control function (PCF) node, an SDP node, as well as other nodes configured for reporting, routing, etc. Description of the plurality of network nodes 302 is made with reference to the network node 304, but other network nodes, such as network nodes 306 and 308 may include similar features. The network node 304 may include a node agent 330 and a network agent 332. The node agent 330 may be configured to collect KPI values for the corresponding node (e.g., file beat to collect the KPIs and counters present in logs), and the network agent 332 may be configured to collect CPU and other statistics of the network (e.g., collect CPU statistics from the network nodes).

The data processing module 310 (or data transformation system) may be configured to receive the KPI values and statistics from the plurality of network nodes 302, as well as historic dimensioning data from the historic dimensional data database 312, and transform the received data based on filtering rules and other transformation rules. The data processing module 310 may be configured to implement the pre-processing module 152 as well as the data analysis module 102 as described with respect to FIG. 1.

The search module 314 (or information system) may be configured to receive the transformed data from the data processing module 310, to search the data, and perform data analytics. For example, the search module 314 may be configured to implement the data analysis module 102 of FIG. 1. The search module 314 may also be configured to store the transformed data. The search module 314 may be configured to perform filtration or searches of data based on a priority of features of a node or other priorities that may be configured by the system.

The ML module 316 may be configured to receive transformed data from the search module 314 and generate at least one capacity prediction based on the transformed data. The ML module 316 may also be configured to implement the search module 314 to perform specific data isolation based on various parameters. For example, if capacity prediction is only desired to be performed based on CPU utilization of the network/nodes, the ML module 316 may receive data from the search module 314 that excludes data not related to CPU utilization. As such, the capacity prediction may only be based on CPU utilization in such embodiments.

The search module 314 may receive the generated capacity predictions from the ML module 316 and may send the capacity predictions, along with related data, to the dashboard 322 for data visualization via an output device.

The search module 314 may output capacity predictions, as well as corresponding data, to the alarm generation API 318 (or alerting API). The alarm generation API 318 may be configured to receive the capacity predictions, and determine, detect or predict, based on the data and the capacity predictions, an anomaly in the network. Based on detecting or predicting an anomaly in the network, the alarm generation API 318 may transmit data or a signal to the monitoring module 320, and the monitoring module may be configured to correspondingly generate an alarm indicating that at least one dimensioning parameter may need to be adjusted to prevent or correct the detected anomaly.

Figure 4:
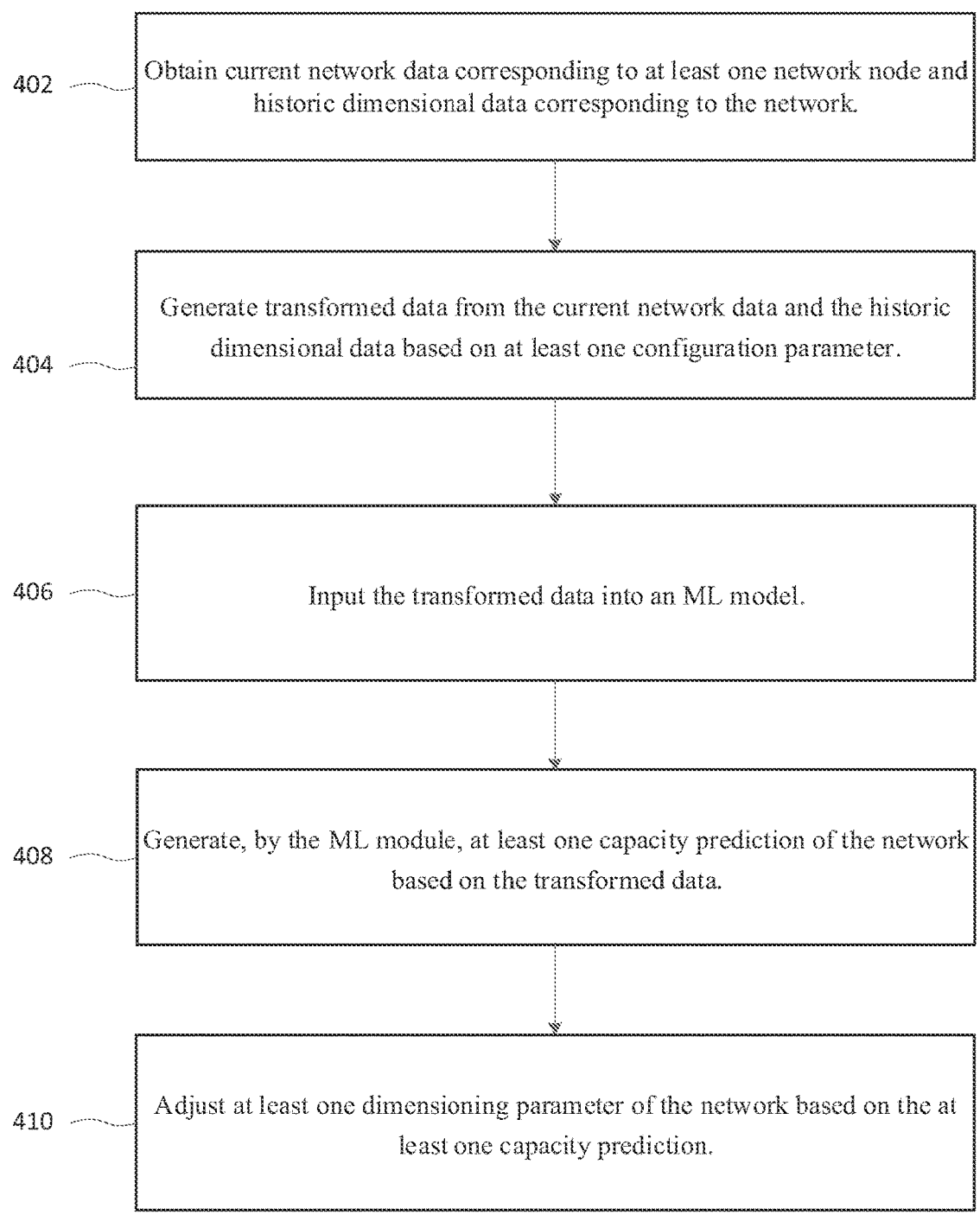
FIG. 4 is a flowchart of a method for capacity prediction, according to an embodiment.

FIG. 4 is a flowchart of a method for capacity prediction, according to an embodiment. In operation 402, the system may obtain network data corresponding to at least one network node and historic dimensional data corresponding to the network. In operation 404, the system may generate transformed data from the network data and the historic dimensional data based on at least one configuration parameter. In operation 406, the system may input the transformed data into an ML model. In operation 408, the system may generate, by the ML module, at least one capacity prediction of the network based on the transformed data. In operation 410, the system may adjust at least one dimensioning parameter of the network based on the at least one capacity prediction.

By implementing historic dimensional data along with network data, transforming the data into a form that may be processed by an ML module, the system may generate capacity predictions for the network by recognizing historical trends in conjunction with current network usages. Thus, the system may proactively adjust dimensioning parameters of the network in anticipate of potential network failures.

Figure 5:
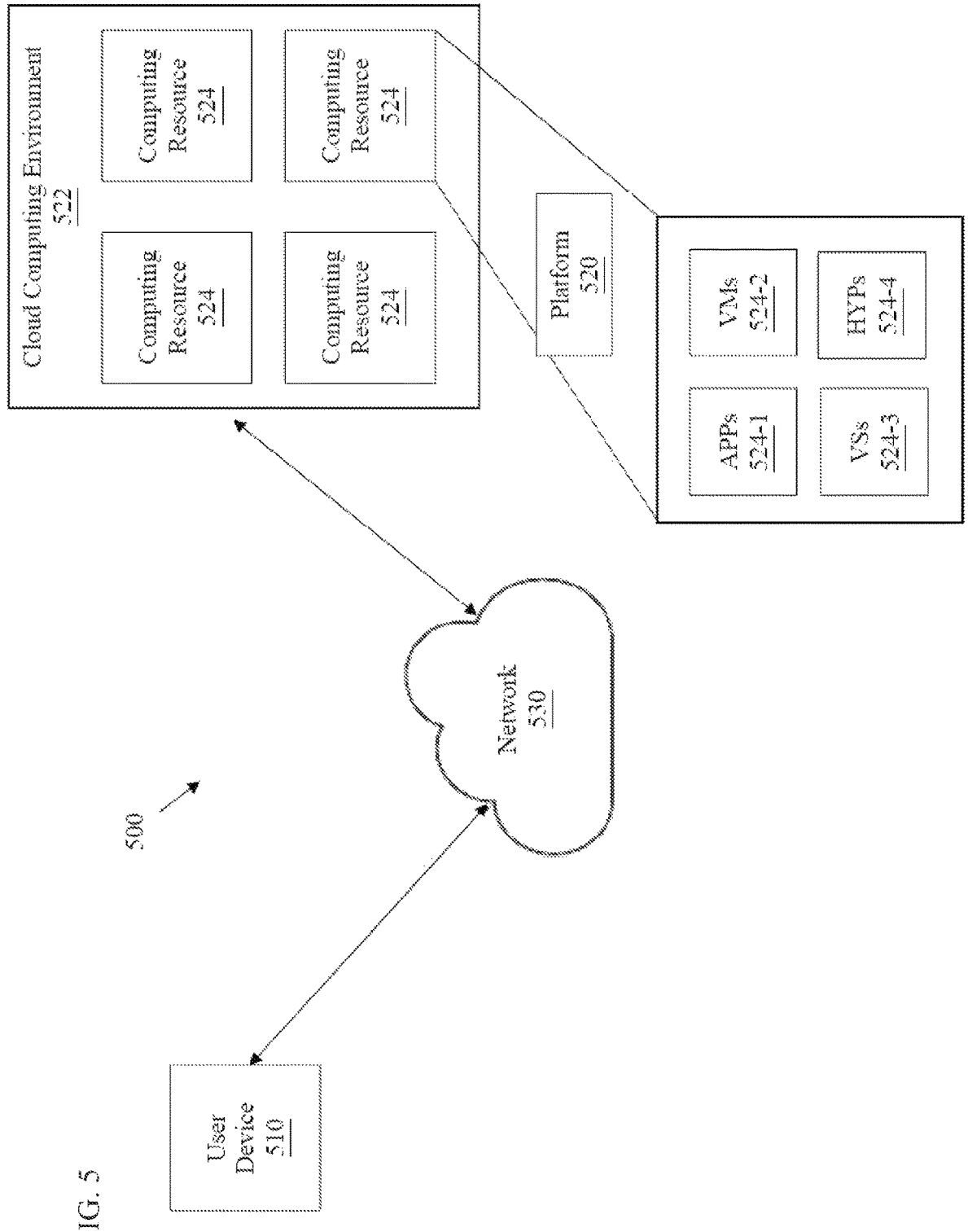
FIG. 5 is a diagram of an example environment in which systems and/or methods, described herein, may be implemented.

Example embodiments disclosed herein provide ML techniques to predict future demand of a network, which may determine capacity needs of network nodes in future use, ensuring that dimensioning of the network (i.e., sizing of the network parameters, such as CPU, memory, nodes, servers, etc.) may be performed optimally. That is, the capacity predictions allow for accurate capacities to be provided to the network without underestimating the capacity needs. Example embodiments disclosed herein may collect the data required for forecasting the dimensioning parameters of the network nodes in an automated manner. A set of ML models may be trained on the collected data to predict the capacity needs. A dashboard may be provided to display descriptive statistics of current usage and predictive statistics of upcoming demands. FIG. 5 is a diagram of an example environment 500 in which systems and/or methods, described herein, may be implemented. As shown in FIG. 5, environment 500 may include a user device 510, a platform 520, and a network 530. Devices of environment 500 may interconnect via wired connections, wireless connections, or a combination of wired and wireless connections. In embodiments, any of the functions and operations described with reference to FIG. 1 above may be performed by any combination of elements illustrated in FIG. 5.

User device 510 includes one or more devices capable of receiving, generating, storing, processing, and/or providing information associated with platform 520. For example, user device 510 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 510 may receive information from and/or transmit information to platform 520.

Platform 520 includes one or more devices capable of receiving, generating, storing, processing, and/or providing information. In some implementations, platform 520 may include a cloud server or a group of cloud servers. In some implementations, platform 520 may be designed to be modular such that certain software components may be swapped in or out depending on a particular need. As such, platform 520 may be easily and/or quickly reconfigured for different uses.

In some implementations, as shown, platform 520 may be hosted in cloud computing environment 522. Notably, while implementations described herein describe platform 520 as being hosted in cloud computing environment 522, in some implementations, platform 520 may not be cloud-based (i.e., may be implemented outside of a cloud computing environment) or may be partially cloud-based.

Cloud computing environment 522 includes an environment that hosts platform 520. Cloud computing environment 522 may provide computation, software, data access, storage, etc. services that do not require end-user (e.g., user device 510) knowledge of a physical location and configuration of system(s) and/or device(s) that hosts platform 520. As shown, cloud computing environment 522 may include a group of computing resources 524 (referred to collectively as "computing resources 524" and individually as "computing resource 524").

Computing resource 524 includes one or more personal computers, a cluster of computing devices, workstation computers, server devices, or other types of computation and/or communication devices. In some implementations, computing resource 524 may host platform 520. The cloud resources may include compute instances executing in computing resource 524, storage devices provided in computing resource 524, data transfer devices provided by computing resource 524, etc. In some implementations, computing resource 524 may communicate with other computing resources 524 via wired connections, wireless connections, or a combination of wired and wireless connections.

As further shown in FIG. 5, computing resource 524 includes a group of cloud resources, such as one or more applications ("APPs") 524-1, one or more virtual machines ("VMs") 524-2, virtualized storage ("VSs") 524-3, one or more hypervisors ("HYPs") 524-4, or the like.

Application 524-1 includes one or more software applications that may be provided to or accessed by user device 510. Application 524-1 may eliminate a need to install and execute the software applications on user device 510. For example, application 524-1 may include software associated with platform 520 and/or any other software capable of being provided via cloud computing environment 522. In some implementations, one application 524-1 may send/ receive information to/from one or more other applications 524-1, via virtual machine 524-2.

Virtual machine 524-2 includes a software implementation of a machine (e.g., a computer) that executes programs like a physical machine. Virtual machine 524-2 may be either a system virtual machine or a process virtual machine, depending upon use and degree of correspondence to any real machine by virtual machine 524-2. A system virtual machine may provide a complete system platform that supports execution of a complete operating system ("OS"). A process virtual machine may execute a single program, and may support a single process. In some implementations, virtual machine 524-2 may execute on behalf of a user (e.g., user device 510), and may manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 524-4 may provide hardware virtualization techniques that allow multiple operating systems (e.g., "guest operating systems") to execute concurrently on a host computer, such as computing resource 524. Hypervisor 524-4 may present a virtual operating platform to the guest operating systems, and may manage the execution of the guest operating systems. Multiple instances of a variety of operating systems may share virtualized hardware resources.

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
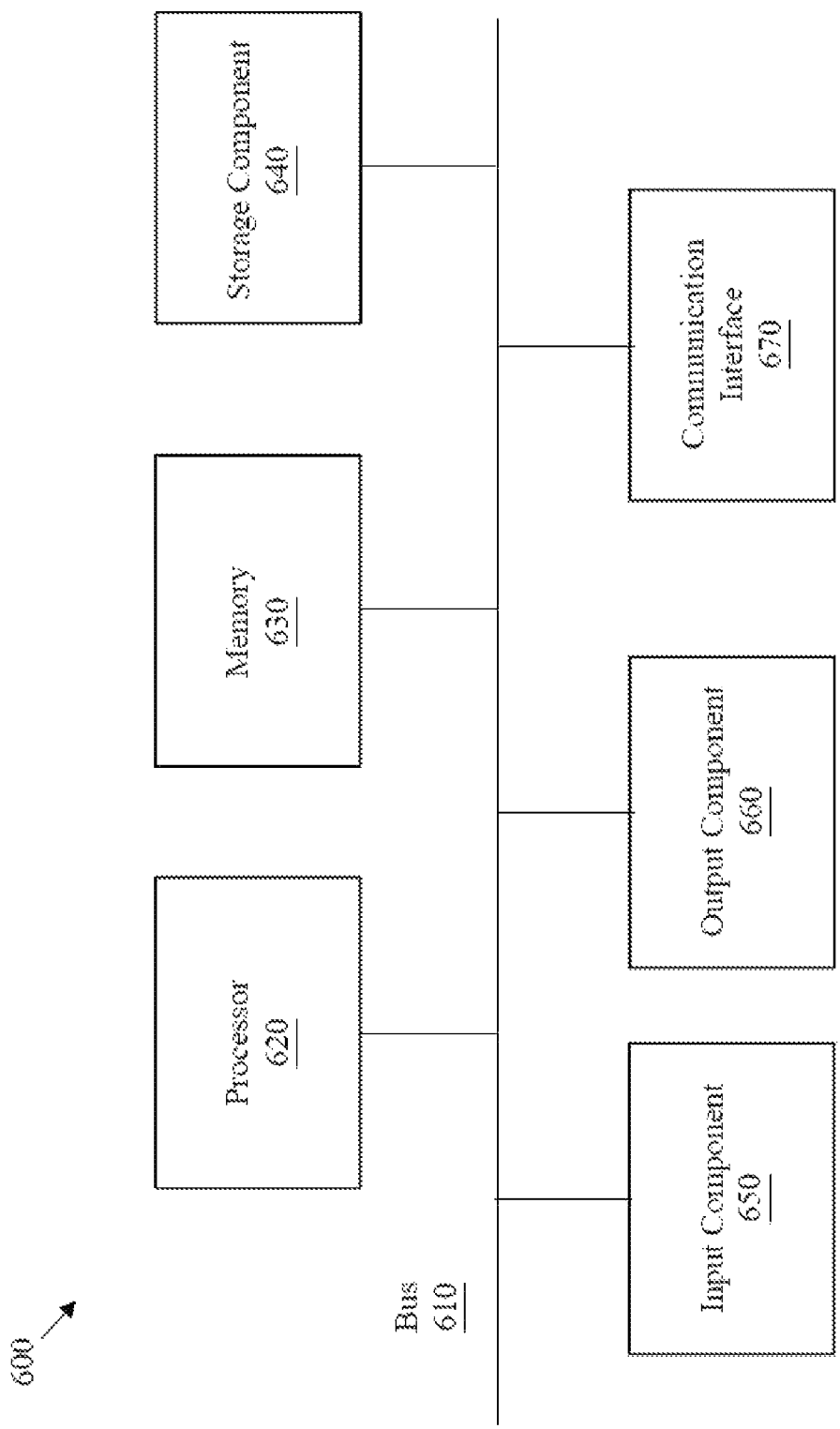
FIG. 6 is a diagram of example components of a device according to an embodiment.

FIG. 6 is a diagram of example components of a device 600. Device 600 may correspond to user device 510 and/or platform 520. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 may be implemented in hardware, firmware, or a combination of hardware and software. Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes in response to processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

In embodiments, any one of the operations or processes of FIGS. 1-4 may be implemented by or using any one of the elements illustrated in FIGS. 5 and 6.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In accordance with aspects of the disclosure, an apparatus for capacity planning in a network may include at least one memory storing instructions and at least one processor configured to execute the instructions to obtain network data corresponding to at least one network node and historic dimensional data corresponding to the network, generate transformed data from the network data and the historic dimensional data based on at least one configuration parameter, input the transformed data into a ML model, generate, by the ML module, at least one capacity prediction of the network based on the transformed data, and adjust at least one dimensioning parameter of the network based on the at least one capacity prediction.

The least one processor may be further configured to execute the instructions to detect an anomaly in the network based on at least one of the network data, the historic dimensional data and the transformed data and generate an alarm in response to detecting the anomaly in the network.

The at least one processor may be configured to execute the instructions to adjust the at least one dimensioning parameter based on the generated alarm.

The at least one processor may be configured to execute the instructions to generate the transformed data based on at least one filtering rule The at least one filtering rule may include at least one of excluding at least a portion of network data or at least a portion of historic dimensional data corresponding to a predetermined time frame and prioritizing at least a portion of network data or at least a portion of historic dimensional data based on at least one data feature.

The at least one processor may be further configured to execute the instructions to obtain the at least one filtering rule from a preconfigured configuration file.

The historic dimensional data may include at least one of a data of dimensioning of the network, a time of dimensioning of the network, a CPU utilization of the network, a memory utilization of the network, and an added processing capacity to the network.

The added processing capacity to the network may include at least one of an added CPU to the network, an added memory to the network, and an added server to the network.

The network data corresponding to the at least one network node may include at least one of an aggregation of a number of successful connections, an aggregation of a number of failed connections, an aggregation of a number of timeouts, a total number of subscribers on the network, a memory utilization percentage, and a number of transactions per a predetermined time period.

In accordance with aspects of the disclosure, a method for capacity planning in a network may include obtaining network data corresponding to at least one network node and historic dimensional data corresponding to the network, generating transformed data from the network data and the historic dimensional data based on at least one configuration parameter, inputting the transformed data into a ML model, generating, by the ML module, at least one capacity prediction of the network based on the transformed data, and adjusting at least one dimensioning parameter of the network based on the at least one capacity prediction.

The method may include detecting an anomaly in the network based on at least one of the network data, the historic dimensional data and the transformed data and generating an alarm in response to detecting the anomaly in the network.

The at least one dimensioning parameter may be adjusted based on the generated alarm.

The transformed data may be generated based on at least one filtering rule.

The at least one filtering rule may include at least one of excluding at least a portion of network data or at least a portion of historic dimensional data corresponding to a predetermined time frame and prioritizing at least a portion of network data or at least a portion of historic dimensional data based on at least one data feature.

The method may include obtaining the at least one filtering rule from a preconfigured configuration file.

The historic dimensional data may include at least one of a data of dimensioning of the network, a time of dimensioning of the network, a CPU utilization of the network, a memory utilization of the network, and an added processing capacity to the network.

The added processing capacity to the network may include at least one of an added CPU to the network, an added memory to the network, and an added server to the network.

The network data corresponding to the at least one network node may include at least one of an aggregation of a number of successful connections, an aggregation of a number of failed connections, an aggregation of a number of timeouts, a total number of subscribers on the network, a memory utilization percentage, and a number of transactions per a predetermined time period.

In accordance with aspects of the disclosure, a non-transitory computer-readable storage medium may store instructions that when executed by at least one processor, cause the at least one processor to obtain first data corresponding to at least one network node in a network and second data corresponding to the network, generate transformed data from the first data and the second data based on at least one configuration parameter, input the transformed data into a ML model, generate, by the ML module, at least one capacity prediction of the network based on the transformed data, and adjust at least one dimensioning parameter of the network based on the at least one capacity prediction.

The instructions, when executed by the at least one processor, may further cause the at least one processor to detect an anomaly in the network based on at least one of the first data corresponding to the at least one network node, the second data corresponding to the network and the transformed data and generate an alarm in response to detecting the anomaly in the network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for capacity planning in a network, the apparatus comprising:
at least one memory storing instructions; and
at least one processor configured to execute the instructions to:
obtain, during a predetermined time frame, network data corresponding to at least one network node and historic dimensional data corresponding to the network;
obtain, from a preconfigured configuration file, at least one threshold condition corresponding to a network parameter threshold, at least one configuration parameter and at least one filtering rule associated with data being obtained during the predetermined time frame;
based on the at least one threshold condition being met, generate transformed data from the network data and the historic dimensional data based on the at least one configuration parameter and the at least one filtering rule;
input the transformed data into a machine learning (ML) model;
generate, by the ML model, at least one temporary capacity prediction of the network based on the transformed data; and
adjust at least one dimensioning parameter of the network based on the at least one temporary capacity prediction,
wherein the at least one threshold condition comprises a central processing unit (CPU) utilization of the network being above a predetermined utilization threshold or a CPU utilization of the at least one network node being above a predetermined utilization threshold.

2. The apparatus of claim 1, wherein the at least one processor is further configured to execute the instructions to:
detect an anomaly in the network based on at least one of the network data, the historic dimensional data and the transformed data; and
generate an alarm in response to detecting the anomaly in the network.

3. The apparatus of claim 2, wherein the at least one processor is configured to execute the instructions to adjust the at least one dimensioning parameter based on the generated alarm.

4. The apparatus of claim 1, wherein the at least one processor is configured to execute the instructions to generate the transformed data based on the at least one filtering rule.

5. The apparatus of claim 4, wherein the at least one filtering rule comprises at least one of:
excluding at least a portion of network data or at least a portion of historic dimensional data corresponding to the predetermined time frame; and
prioritizing at least a portion of network data or at least a portion of historic dimensional data based on at least one data feature.

6. The apparatus of claim 1, wherein the historic dimensional data comprises at least one of a data of dimensioning of the network, a time of dimensioning of the network, a CPU utilization of the network, a memory utilization of the network, and an added processing capacity to the network.

7. The apparatus of claim 6, wherein the added processing capacity to the network comprises at least one of an added CPU to the network, an added memory to the network, and an added server to the network.

8. The apparatus of claim 1, wherein the network data corresponding to the at least one network node comprises at least one of an aggregation of a number of successful connections, an aggregation of a number of failed connections, an aggregation of a number of timeouts, a total number of subscribers on the network, a memory utilization percentage, and a number of transactions per a predetermined time period.

9. A method for capacity planning in a network, the method comprising:
obtaining, during a predetermined time frame, network data corresponding to at least one network node and historic dimensional data corresponding to the network;
obtaining, from a preconfigured configuration file, at least one threshold condition corresponding to a network parameter threshold, at least one configuration parameter and at least one filtering rule associated with data being obtained during the predetermined time frame;
based on the at least one threshold condition being met, generating transformed data from the network data and the historic dimensional data based on the at least one configuration parameter and the at least one filtering rule;
inputting the transformed data into a machine learning (ML) model;
generating, by the ML model, at least one temporary capacity prediction of the network based on the transformed data; and
adjusting at least one dimensioning parameter of the network based on the at least one temporary capacity prediction,
wherein the at least one threshold condition comprises a central processing unit (CPU) utilization of the network being above a predetermined utilization threshold or a CPU utilization of the at least one network node being above a predetermined utilization threshold.

10. The method of claim 9, further comprising:
detecting an anomaly in the network based on at least one of the network data, the historic dimensional data and the transformed data; and
generating an alarm in response to detecting the anomaly in the network.

11. The method of claim 10, wherein the at least one dimensioning parameter is adjusted based on the generated alarm.

12. The method of claim 9, wherein the transformed data is generated based on the at least one filtering rule.

13. The method of claim 12, wherein the at least one filtering rule comprises at least one of:
excluding at least a portion of network data or at least a portion of historic dimensional data corresponding to the predetermined time frame; and
prioritizing at least a portion of network data or at least a portion of historic dimensional data based on at least one data feature.

14. The method of claim 9, wherein the historic dimensional data comprises at least one of a data of dimensioning of the network, a time of dimensioning of the network, a CPU utilization of the network, a memory utilization of the network, and an added processing capacity to the network.

15. The method of claim 14, wherein the added processing capacity to the network comprises at least one of an added CPU to the network, an added memory to the network, and an added server to the network.

16. The method of claim 9, wherein the network data corresponding to the at least one network node comprises at least one of an aggregation of a number of successful connections, an aggregation of a number of failed connections, an aggregation of a number of timeouts, a total number of subscribers on the network, a memory utilization percentage, and a number of transactions per a predetermined time period.

17. A non-transitory computer-readable storage medium storing instructions that, when executed by at least one processor, cause the at least one processor to:
 obtain, during a predetermined time frame, first data corresponding to at least one network node in a network and second data corresponding to the network;
 obtain, from a preconfigured configuration file, at least one threshold condition corresponding to a network parameter threshold, at least one configuration parameter and at least one filtering rule associated with data being obtained during the predetermined time frame;
 based on the at least one threshold condition being met, generate transformed data from the first data and the second data based on the at least one configuration parameter and the at least one filtering rule;
 input the transformed data into a machine learning (ML) model;
 generate, by the ML model, at least one temporary capacity prediction of the network based on the transformed data; and
 adjust at least one dimensioning parameter of the network based on the at least one temporary capacity prediction,
 wherein the at least one threshold condition comprises a central processing unit (CPU) utilization of the network being above a predetermined utilization threshold or a CPU utilization of the at least one network node being above a predetermined utilization threshold.

18. The storage medium of claim 17, wherein the instructions, when executed by the at least one processor, further cause the at least one processor to:
 detect an anomaly in the network based on at least one of the first data corresponding to the at least one network node, the second data corresponding to the network and the transformed data; and
 generate an alarm in response to detecting the anomaly in the network.

* * * * *